United States Patent [19]

Halter

[11] Patent Number: 5,094,790

[45] Date of Patent: Mar. 10, 1992

[54] METHOD OF AN APPARATUS FOR PRODUCING A WEB OF PLATELIKE THERMOPLASTIC

[75] Inventor: Hartmut Halter, Troisdorf, Fed. Rep. of Germany

[73] Assignee: Reifenhauser GmbH & Co. Maschinenfabrik, Troisdorf, Fed. Rep. of Germany

[21] Appl. No.: 604,859

[22] Filed: Oct. 26, 1990

[30] Foreign Application Priority Data

Oct. 27, 1989 [DE] Fed. Rep. of Germany ....... 3935819

[51] Int. Cl.$^5$ .............................................. B29C 47/92
[52] U.S. Cl. ................................. 264/40.5; 264/40.7; 264/210.1; 264/211.12; 425/141; 425/149; 425/325; 425/377
[58] Field of Search .................. 264/40.1, 40.5, 40.7, 264/175, 210.1, 211.12; 425/135, 136, 141, 145, 149, 200, 207, 363, 367, 376.1, 377, 325

[56] References Cited

U.S. PATENT DOCUMENTS 3,936,258 2/1976 Lake ................................ 425/135
4,470,937 9/1984 Sugimoto et al. ................ 264/40.1

FOREIGN PATENT DOCUMENTS 62-33615 2/1987 Japan .

OTHER PUBLICATIONS

English—Language Translation of Japanese Reference 62-33615 (Published Feb. 13, 1987).

Primary Examiner—Leo B. Tentoni
Attorney, Agent, or Firm—Herbert Dubno; Andrew Wilford

[57] ABSTRACT

Platelike webs of thermoplastic material are produced by extruding a strip of the thermoplastic material and passing it through a roll unit having a pair of intake rolls upstream of which a bank of the material is formed. The delivery speed is controlled in response to the bearing pressure of the intake rolls.

11 Claims, 2 Drawing Sheets

METHOD OF AN APPARATUS FOR PRODUCING A WEB OF PLATELIKE THERMOPLASTIC

FIELD OF THE INVENTION

My present invention relates to a method of producing a web of thermoplastic material which, upon cooling, has a certain degree of rigidity and thus can be referred to as a platelike material. More particularly, the invention relates to the extrusion of a thermoplastic strip which can be rolled to thickness and cooled to form the platelike web, to the method of fabricating it and to an apparatus for making the web and, especially, for controlling the thickness of the web as made.

BACKGROUND OF THE INVENTION

For the reliable production of platelike webs of thermoplastic synthetic resin materials of a given thickness, e.g. for cutting up into deep-drawing blanks, depending upon the type of synthetic resin of thermoplastic resin or thermoplastic material involved and the speed with which the latter is extruded and fed to the rolling unit, a bulge of the material, referred to generally as a bank, can form at the upstream side of the nip or gap between the intake rolls of the rolling unit.

This bank should, in thickness, not exceed a maximum thickness or fall below a minimum thickness if defects in the finished strip of the rolled material and thus in the finished plates or on the surfaces of the resulting web are not to arise. The tolerance range between the maximum permissible and minimum permissible thicknesses or sizes of the bank is relatively small.

It has been proposed heretofore to measure the thickness of the bank by mechanical sensors or optically, for example, by a laser triangulation method.

Mechanical measurement of the bank thickness is not sufficiently accurate. The imprecision of mechanical measurement can result in detrimental defects in the web or at the surface thereof. An optical measurement is very expensive and also requires expensive circuitry for evaluating the optical measurement since following the obtaining of an optical value, conversion thereof for regulation and control of the shape imported to the web is necessary.

Reference may be had in this respect to the Japanese Patent Document JA 62 33 615 A.

In this latter system, bearing pressure on an intake roll of a rolling unit is measured and controlled and upon deviation of an actual value of the bearing pressure from a setpoint value, an alarm signal is generated so that the process can be interrupted and the system adjusted to accept a fresh feed of the thermoplastic strip.

This system cannot provide effective control of the thickness of the web as is desirable.

The bearing pressure of an intake roll will be understood to mean the pressure which the rolling of the web applies to the bearings of the roll defining the nip through which the web or strip passes.

OBJECTS OF THE INVENTION

It is the principal object of the present invention to provide an improved method of controlling the shaping of the plate web of thermoplastic material or regulating same with high precision, in particular, to control the thickness of that web.

Another object of the invention is to provide a method of producing webs of platelike thermoplastic material whereby drawbacks of earlier systems are obviated.

Still another object of my invention is to provide an improved apparatus for this purpose and, especially, an improved system for controlling the thickness of the web.

SUMMARY OF THE INVENTION

These objects and others which will become apparent hereinafter are attained in accordance with the invention by a method of producing a web of a thermoplastic material having a platelike configuration after cooling which comprises the steps of:

(a) continuously extruding a continuous strip of hot thermoplastic material with constant rheological properties;

(b) shaping the strip in a rolling unit and cooling the strip to form the web, the strip of hot thermoplastic material being fed initially to an intake roll of the unit at a rate such that a bank of the material is formed adjacent an upstream side of the intake roll;

(c) measuring a bearing pressure of the intake roll and forming from the intake pressure a signal proportional to a thickness of the web;

(d) establishing a predetermined roll-gap width of the rolling unit and maintaining the gap width constant; and (e) controlling a web-delivery speed of the rolling unit in response to the signal to regulate the thickness of the web.

In particular, therefore, the invention is characterized by the fact that the rolling unit is supplied with a strip or strand of the thermoplastic material with constant rheological properties, that a control circuit having thickness control of the platelike material web is provided, that an actual value signal for the thickness of the web is generated which is proportional to a measured bearing pressure at the intake rolls of the rolling unit and that the gap width of the rolling unit is set to a predetermined desired or set point gap width and held constant and the controlled circuit controls the delivery speed of the product from the rolling unit.

The invention is based upon my surprising discovery that there is a proportional relationship between the bearing pressure of the intake rolls on the one hand and the thickness of the bank and hence of the platelike material web on the other in accordance with a clear functional relationship as long as the rheological parameters of the thermoplastic strip remain constant.

According to the invention, therefore, the thickness or size of the bank of thermoplastic material at the upstream side of the intake rolls need no longer be directly measured by mechanical or optical techniques.

Indeed the invention utilizes an entirely different measured value. namely, the bearing pressure from at least one of the intake rolls. This bearing pressure in the form of a signal can be measured with surprisingly great measurement precision and the bearing pressure signal can be fed as a control value into a control circuit. The web-delivery speed may then be controlled automatically by the signal by a control circuit receiving the signal as an actual-value input representing an actual value of the web thickness. Of course, if desired, it may be displayed to allow an operator to adjust the apparatus for producing the web manually.

Of course, even where the measured value is fed into the control circuit for automatic regulation of the thickness, a display can additionally be provided.

According to another aspect of the invention, a roll unit is provided for carrying out the method and comprises:

an extruder for continuously extruding a continuous strip of hot thermoplastic material with constant rheological properties;

a rolling unit downstream from the extruder and receiving the strip therefrom for rolling and cooling the strip to form the web, the strip of hot thermoplastic material being fed initially to an intake roll of the unit at a rate such that a bank of the material is formed adjacent a upstream side of the intake roll;

means for measuring a bearing pressure of the intake roll and forming from the intake pressure a signal proportional to a thickness of the web;

means for establishing a predetermined roll-gap width of the rolling unit and maintaining the gap width constant; and a control circuit connected to the means for measuring for controlling a web-delivery speed of the rolling unit in response to the signal to regulate the thickness of the web.

At least one of the intake rolls of the roll unit can thus be journaled in a pressure-measuring sensor or unit which permits the bearing pressure to be measured in a highly sensitive manner. In other words the intake roll is journaled in pressure pickups forming a device for measuring and generating the signal as a delicately sensitive measure of the bearing pressure.

The pressure sensor or pressure pickups can be connected with a bearing pressure display or indicating device and/or with a measured value convertor for use of the control signal in the controlled circuit and thereby connected to the latter. The gap width between the intake rolls is generally adjustable in accordance with the invention as well.

BRIEF DESCRIPTION OF THE DRAWINGS

The above and other objects, features and advantages of my invention will become more readily apparent from the following description, reference being made to the accompanying highly diagrammatic drawings in which.

SPECIFIC DESCRIPTION

Figure 1:
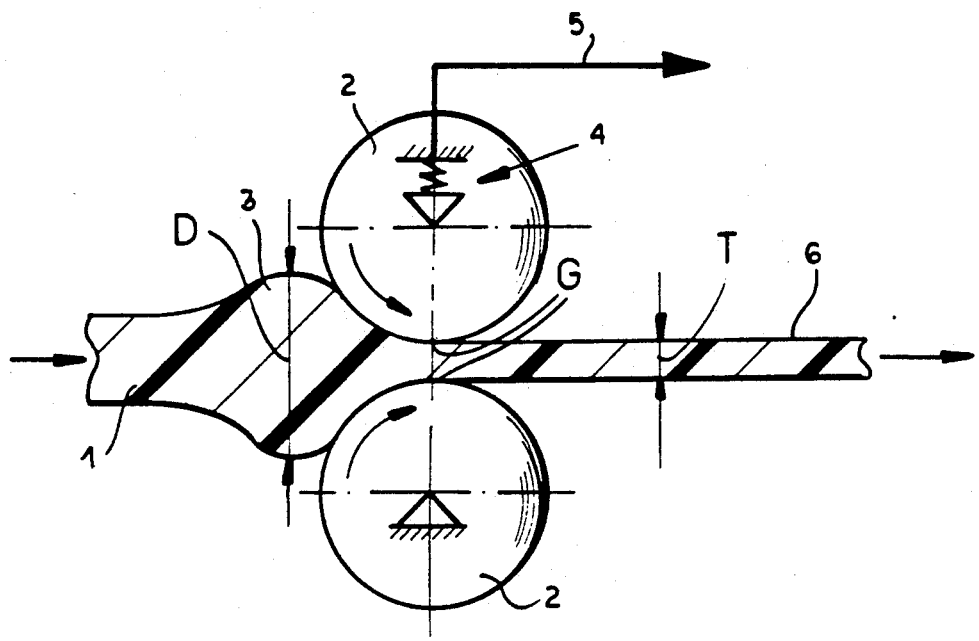
FIG. 1 is a diagrammatic cross sectional view illustrating principals of the invention.

From FIG. 1, it can be seen that a strip 1 of thermoplastified synthetic resin, outputted by a wide-slit nozzle of a worm-type extrusion press is delivered at a predetermined speed to a form-imparting roller unit which has, at its intake side, a pair of intake rolls 2 defining a gap G between them. The speed of the strip 1, its viscosity, temperature and flow properties, previously referred to herein as rheological properties are constant. Upstream of the rolls 2 and directly adjacent the latter, there is formed a bank or bead 3 of the thermoplastic material, the thickness of which is proportional to the thickness T of the resulting web 6.

As is apparent from FIG. 1, the upper roll 2 is journaled in a pressure measurement sensor 4 which provides an output of the bearing pressure 5 in a highly precise and sensitive manner.

The bearing pressure, of course, is the radial pressure or reaction force delivered to the bearing by the roll when it engages the thermoplastic material. If the sensor is a piezo electric device, the output 5 will be electrical output. The output 5 feeds a control system as will be described. The width of the gap G is held constant and, of course, can be varied to produce webs 6 of different thicknesses.

Figure 2:
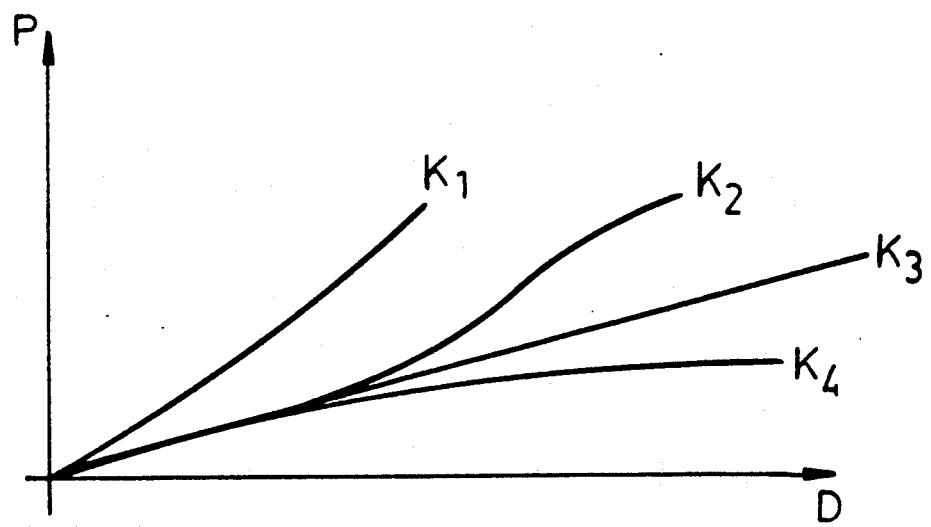
FIG. 2 is a graph in which the relationship between the bearing pressure (plotted along the ordinate) is plotted against thickness (plotted against the abscissa)

In FIG. 2 I have shown the relationship between the bearing pressure p, plotted along the ordinate and the bank thickness D plotted along the abscissa. The relationship between the two, as represented by the characteristics $K_1$ through $K_4$ is substantially linear, the characteristics $K_1$ through $K_4$ representing different thermoplastics or different sets of constant rheological parameters.

Thus it will be apparent that the bearing pressure p can serve as a measurement of the thickness D allowing the system to be controlled by the bearing pressure. What is indeed surprising is that the measurement of the bearing pressure can provide a highly precise measurement of, or equivalent to, the thickness D.

Figure 3:
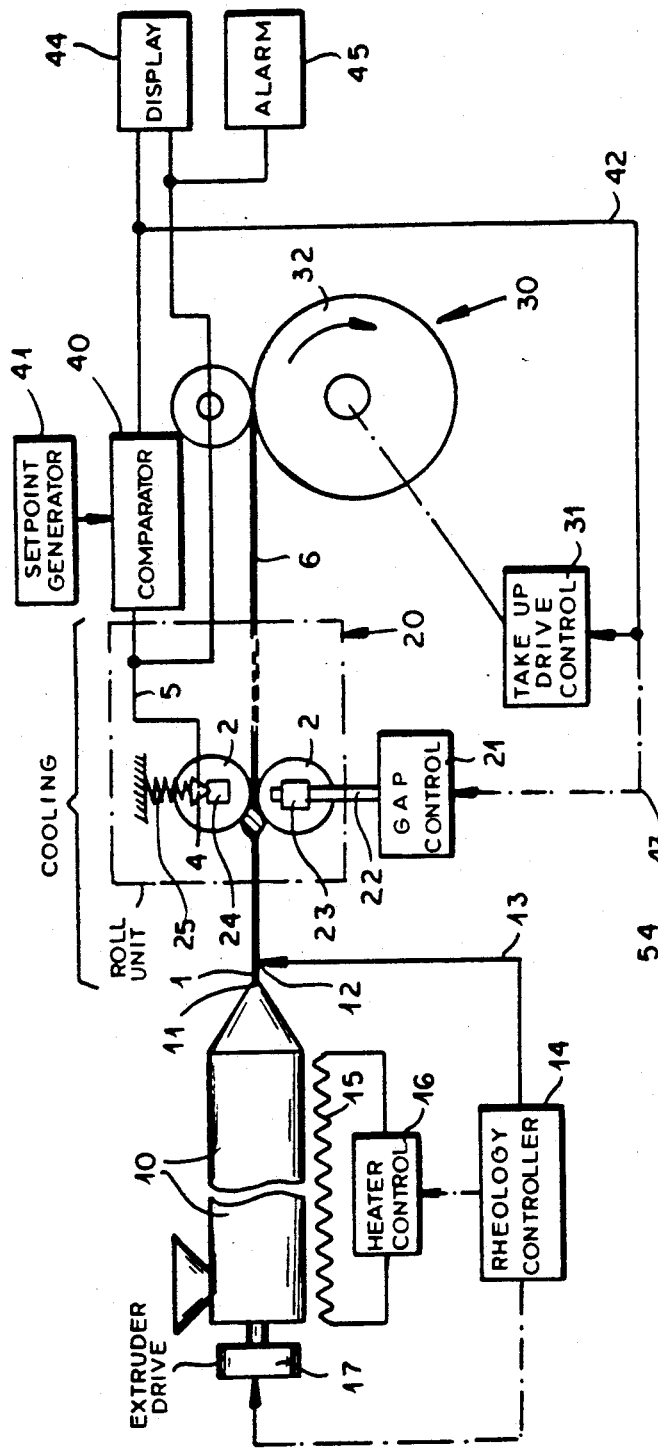
FIG. 3 is a diagram of an apparatus for producing the web of plate like material.

As can be seen from FIG. 3, the apparatus can include an extruder 10 with a wide-slit nozzle 11 which outputs the strip 1 of the thermoplastic material. Rheological parameters can be monitored at 12 and a feedback signal supplied at 13 to a rheological control 14 which may regulate the heater 15 of the altitude through a heater control 16 or the speed of the worms of the extruder through the extruder drive 17 to maintain the rheological parameters constant.

In FIG. 3, moreover, a roll unit is represented at 20 and comprises at the intake side rolls two previously mentioned.

Additional sets of rolls may be provided as well and the rolls may be driven so that the output velocity of the web 6 or delivery speed can be controlled. In the embodiment illustrated this delivery speed is controlled by a takeup drive control 31 of a takeup unit 30 having the takeup roll 32.

The roll unit 20 is provided with a gap controller 21 driving a spindle 22 connected to the bearing 23 of the lower roll 2. The upper roll is here journaled in a bearing 24 provided with the pressure sensor 4 braced against a spring 25.

The output 5 from the pressure sensor is supplied to a comparator 40 forming an evaluating unit and, if necessary, a convertor, the comparator receiving a setpoint generator 41 and delivering a control signal at 42 to the takeup drive control. It is possible, where the gap width is not maintained constant, also to control the gap width as shown by the dot dash line 43 although this response is not required in accordance with the principles of the present invention.

The output of the comparator also may generate a visual display in the display unit 44 which also may display the output of the bearing pressure sensor directly and thereby allow an operator to control the apparatus.

An alarm 45 may also be operated by the pressure sensor.

Figure 4:
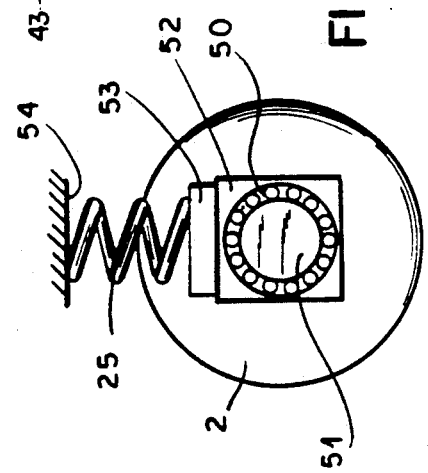
FIG. 4 is a detail view of a bearing sensor for outputting the bearing pressure used in the apparatus of FIG. 3.

In FIG. 4, I have shown a bearing 50 in which a shaft 51 of the upper intake roller 2 is journaled. The bearing block 52 receiving the bearing is provided with a pieza electric load cell 53 providing the output 5 and braced against a spring 25 which, in turn, is seated against a stationary housing 54.

I claim:

1. A method of producing a web of uniform thickness of a thermoplastic material having a platelike configuration after cooling, comprising the steps of:
   (a) continuously extruding a continuous strip of hot thermoplastic material with constant rheological properties;
   (b) shaping said strip in a rolling unit and cooling said strip to form said web, said strip of hot thermoplastic material being fed initially to an intake roll of said unit at a rate such that a bank of said material is formed adjacent an upstream side of said intake roll;
   (c) measuring a bearing pressure of said intake roll and forming from said intake pressure a signal proportional to a thickness of said web;
   (d) establishing a predetermined roll-gap width of said rolling unit and maintaining said gap width constant;
   (e) delivering said web which exits from said rolling unit to a takeup roll; and
   (f) controlling a web-delivery speed of said web between said rolling unit and said takeup roll in response to said signal to regulate the thickness of said web, said control being achieved through regulation of a takeup drive control that regulates speed of said takeup roll.

2. The method defined in claim 1 wherein said constant rheological properties are controlled at said extruder.

3. The method defined in claim 1 wherein said web-delivery speed is controlled automatically by said signal by a control circuit receiving said signal as an actual-value input representing an actual value of said thickness.

4. The method defined in claim 1, further comprising the step of displaying said signal.

5. The method defining in claim 1, further comprising the step of outputting an alarm in response to said signal.

6. An apparatus for producing a web of uniform thickness of a thermoplastic material having a platelike configuration after cooling, said apparatus comprising:
   an extruder for continuously extruding a continuous strip of hot thermoplastic material with constant rheological properties;
   a rolling unit downstream from said extruder and receiving said strip therefrom for rolling and cooling said strip to form said web, said strip of hot thermoplastic material being fed initially to an intake roll of said unit at a rate such that a bank of said intake roll;
   means for measuring a bearing pressure of said intake roll and forming from said intake pressure a signal proportional to a thickness of said web;
   means for establishing a predetermined roll-gap width of said rolling unit and maintaining said gap width constant;
   a takeup roll for receiving said web from said rolling unit;
   a takeup control connected to and regulating speed of said takeup roll; and
   a control circuit connected to said means for measuring form controlling a web-delivery speed of said web between said rolling unit and said takeup roll in response to said signal to regulate the thickness of said web, said control circuit controlling said takeup control.

7. The apparatus defined in claim 6 wherein said intake roll is journaled in pressure pickups forming said means for measuring and generating said signal as a delicately sensitive measure of said bearing pressure.

8. The apparatus defined in claim 7 wherein said pressure pickups are connected to a bearing pressure indicator.

9. The apparatus defined in claim 8 wherein said bearing pressure indicator is an alarm.

10. The apparatus defined in claim 8 wherein said bearing pressure indicator is a display.

11. The apparatus defined in claim 10, further comprising means for controlling said constant rheological properties at said extruder.

* * * * *